(No Model.)
W. T. CHRISTY & E. C. SHERIDAN.
WATER WHEEL.
No. 255,720. Patented Mar. 28, 1882.
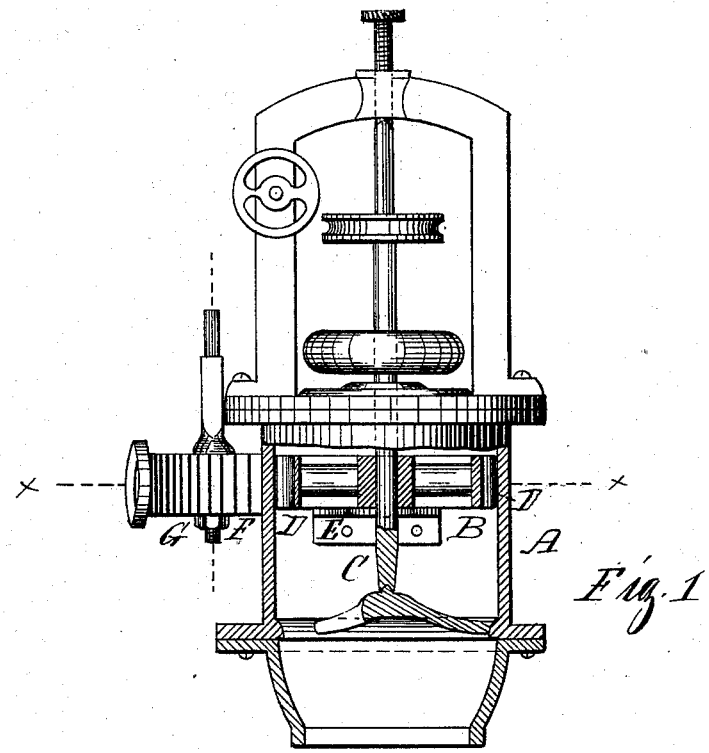
Fig. 1
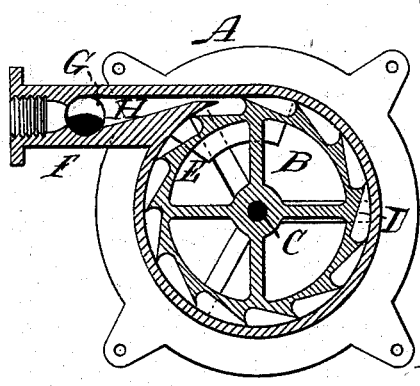
Fig. 2
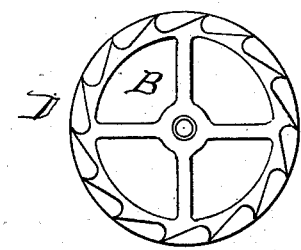
Fig. 3
Fig. 4
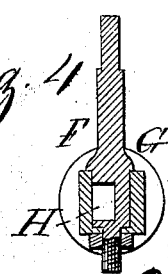
Witnesses
A. F. Sparkes
S. R. Steadman
Inventors
William T. Christy &
Edward C. Sheridan
By Horace Harris
Atty

UNITED STATES PATENT OFFICE.

WILLIAM T. CHRISTY AND EDWARD C. SHERIDAN, OF NEWARK, NEW JERSEY; SAID SHERIDAN ASSIGNOR TO SAID CHRISTY; SAID CHRISTY ASSIGNOR OF ONE-THIRD TO WILLIAM J. GREASON, JR., OF SAME PLACE.

WATER-WHEEL.

SPECIFICATION forming part of Letters Patent No. 255,720, dated March 28, 1882.

Application filed September 20, 1881. (No model.)

*To all whom it may concern:*

Be it known that we, WILLIAM T. CHRISTY and EDWARD C. SHERIDAN, of Newark, in the county of Essex and State of New Jersey, have invented a new and useful Improvement in Water-Wheels, of which the following is a specification.

Our invention relates to an improvement in water-wheels, whereby we avoid loading our wheels with any dead-water, and we have no backwater to diminish the power, and we largely reduce the friction; and it consists in a plug valve or gate, a chute, and a water-wheel with bottomless buckets riding upon a plate or table in a suitable cylinder or case.

Figure 1 is a side elevation, partly in section. Fig. 2 is a horizontal section on line $x\ x$, Fig. 1. Fig. 3 shows the wheel inverted. Fig. 4 is a detailed view.

In our construction, A is a cylindrical case, or it may be globular or other form, containing a horizontal water-wheel, B, hung on the spindle C, having suitable bearings, from which spindle power may be communicated for any purpose.

The buckets D have no bottom, but are made to ride on the plate or table E, which for an instant becomes a bottom. This table is attached to one side of the inner surface of the case and so arranged that the lower end of the buckets in their revolution will just sweep the upper surface of the table, and while the buckets are passing over it, at the time charged with water, the table becomes a bottom for them, holding the water long enough to have them get the full force of the charge, and then it escapes as the buckets pass off from the table, and leaves them for the rest of the circuit unencumbered. The water is fed in from the chute F, in which is a plug gate or valve, G. The opening is a notch, H, cut out of one side of the plug, and the turning of this regulates the flow of water or entirely cuts it off. When the water is fed on it passes through the chute and immediately fills the buckets (see Fig. 2) and gives motion to the wheel, the buckets at the time of filling riding upon the table E; but the movement of the wheel instantly carries the buckets off from the table, and, having no bottom, leaves the water to drop unobstructed into the basin I or tail-race below. Thus it will be seen that all the force of the water is expended on the buckets, and then is instantly discharged, leaving no water to be carried and no backwater to obstruct the action of the wheel. This becomes, then, a very simple and effective water wheel or motor. Some modification of the form of gate and of feeding the water to the wheel may be employed and the same effect be produced.

We claim—

1. The wheel B, having the bottomless buckets D and working in the case A, in combination with the plate or table E and chute F, substantially as and for the purpose specified.

2. The combination of the case A, wheel B, buckets D, table E, chute F, and gate G, substantially as and for the purpose set forth.

WILLIAM T. CHRISTY.
EDWARD C. SHERIDAN.

Witnesses:
HORACE HARRIS,
S. R. STEADMAN.